(12) United States Patent
Foote et al.

(10) Patent No.: US 11,372,476 B1
(45) Date of Patent: Jun. 28, 2022

(54) LOW PROFILE HELMET MOUNTED DISPLAY (HMD) EYE TRACKER

(71) Applicant: Rockwell Collins, Inc., Cedar Rapids, IA (US)

(72) Inventors: Bobby D. Foote, Marion, IA (US); Brock A. Macknick, Marion, IA (US); Jeffrey E. Crow, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 269 days.

(21) Appl. No.: 16/104,331

(22) Filed: Aug. 17, 2018

Related U.S. Application Data (60) Provisional application No. 62/632,607, filed on Feb. 20, 2018.

(51) Int. Cl.
| | |
|---|---|
| *G06F 3/01* | (2006.01) |
| *G02B 27/01* | (2006.01) |
| *H04N 5/225* | (2006.01) |
| *G02B 27/09* | (2006.01) |

(52) U.S. Cl.
CPC ........ *G06F 3/013* (2013.01); *G02B 27/0172* (2013.01); *G02B 27/0977* (2013.01); *H04N 5/2253* (2013.01); *H04N 5/2256* (2013.01)

(58) Field of Classification Search
CPC . G02F 3/013; G02B 27/0977; G02B 27/0172; H04N 5/2256
See application file for complete search history.

(56) References Cited

U.S. PATENT DOCUMENTS

| | | | |
|---|---|---|---|
| 4,702,575 A | 10/1987 | Breglia | |
| 5,646,783 A | 7/1997 | Banbury | |
| 6,943,754 B2 | 9/2005 | Aughey et al. | |
| 7,391,887 B2 | 6/2008 | Durnell | |
| 7,401,920 B1 | 7/2008 | Kranz et al. | |
| 7,522,344 B1 | 4/2009 | Curatu et al. | |
| 8,864,310 B2 | 10/2014 | Gross et al. | |
| 2006/0238877 A1* | 10/2006 | Ashkenazi | G06F 3/013 359/630 |
| 2006/0243805 A1 | 11/2006 | Mative | |
| 2008/0048931 A1 | 2/2008 | Ben-Ari | |
| 2008/0136916 A1 | 6/2008 | Wolff | |

(Continued)

FOREIGN PATENT DOCUMENTS

WO        9905988 A2    2/1999

*Primary Examiner* — Joseph P Martinez
*Assistant Examiner* — Vipin Patel
(74) *Attorney, Agent, or Firm* — Suiter Swantz pc llo (57) ABSTRACT

A low-profile eye-tracking system for an off-visor helmet-mounted display (HMD) includes annular illuminators clipped to, and aligned with, the terminal component (e.g., the emitter or combiner) of the HMD optical chain. The illuminators include visible-light or IR light sources mounted around the circumference of the illuminator for bouncing light off the visor's inner surface and into the pilot's left or right eye (the HMD may include separate eye-tracking systems for each eye). Image sensors are positioned to sequentially capture images of the illuminated eyes reflected off the visor surface. HMD onboard electronics analyze the captured image sequence to determine the azimuth and elevation of the pilot's eye relative to the centerline of the HMD optics.

16 Claims, 7 Drawing Sheets

(56) References Cited

U.S. PATENT DOCUMENTS

| | | |
|---|---|---|
| 2009/0174864 A1 | 7/2009 | Hutchin |
| 2009/0189974 A1* | 7/2009 | Deering ............... G02B 27/017 348/46 |
| 2010/0141555 A1* | 6/2010 | Rorberg ............... G02B 27/017 345/8 |
| 2017/0059886 A1* | 3/2017 | Fayolle .................. G02C 7/025 |

* cited by examiner

208 — Applying, via the at least one processor, distortion correction to the at least one sequence of one or more images based on a curvature of the visor

210 — Applying, via the at least one processor, auto-gain to the at least one sequence of one or more images based on at least one of a curvature of the visor and a brightness of the sequence of images

*FIG. 6C*

LOW PROFILE HELMET MOUNTED DISPLAY (HMD) EYE TRACKER

CROSS-REFERENCE TO RELATED APPLICATIONS

The instant application claims priority under 35 U.S.C § 119 to U.S. provisional patent application Ser. No. 62/632,607, filed Feb. 20, 2018. Said provisional patent application Ser. No. 62/632,607 is herein incorporated by reference in its entirety.

BACKGROUND

Advanced helmet-mounted displays (HMD) can provide an aircraft pilot with a full 360-degree view of the surrounding environment by combining exterior sensor feeds, essentially enabling the pilot to see through the aircraft exterior in all directions while augmenting the view with relevant information about surrounding objects (e.g., their distance from the aircraft, their velocity and bearing, identifying details of proximate aircraft). Off-visor HMD systems utilize a reflective coating on the inside of the HMD's visor, projecting fused sensor output through optics substantially aligned with the pilot's eyes. The reflective coating reflects the projected imagery into the pilot's eyes without blocking the pilot's field of view with physical components.

The HMD's ability to dynamically generate a view corresponding to where the pilot is currently looking depends on sophisticated head-tracking systems that determine with high precision the position and orientation of the pilot's head relative to the position of the aircraft itself. However, even cutting-edge HMD systems have a field of view (FOV) of approximately 40°×30°. While this is sufficient to meet the requirements of contemporary fighter craft, it is also true that even as the aircraft maintains a consistent course, the orientation of the pilot's eyes may also continually change relative to the head. Accordingly, it would be desirable to extend tracking capability beyond the FOV. Furthermore, the increased stress levels associated with the operating environments of such aircraft suggest that eye tracking functionality would provide additional health monitoring data above and beyond its utility in training and operational scenarios. However, it is difficult to incorporate eye tracking into an HMD without either inhibiting the efficiency of the HMD optics, obstructing the pilot's FOV, or adding excessive weight.

SUMMARY

In one aspect, embodiments of the inventive concepts disclosed herein are directed to a low-profile eye tracking system for an off-visor helmet mounted display (HMD). The eye tracking system includes illuminators clipped to, and aligned substantially with, the terminal component (e.g., emitter, combiner) of the HMD optical chain. The illuminators include IR light sources mounted around the circumference of the illuminator; the IR light sources bounce IR light off the reflective inner surface of the HMD visor and into the pilot's eye. The eye tracking system includes an IR camera positioned to sequentially capture images of the illuminated eye reflected in the HMD visor. The HMD electronics receive and analyze the captured image sequence to determine the azimuth and elevation of the pilot's eye (relative to the centerline of the HMD optics) from each image.

In a further aspect, embodiments of the inventive concepts disclosed herein are directed to a method for eye tracking for a helmet-mounted display (HMD). The method includes illuminating one or both eyes of the wearer of the HMD by reflecting light off an interior surface of a visor of the HMD and into the eye, the light emitted by light sources proximate to a display projector assembly (DPA) of the HMD. The method include capturing a sequence of images of the illuminated eye or eyes via image sensors of the HMD, the images reflected by the interior surface of the visor. The method includes determining, via onboard processors of the HMD, the azimuth and elevation of each illuminated eye by analyzing the sequence of reflected images.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a low-profile eye tracking system for an off-visor helmet-mounted display (HMD). The eye tracking system adds eye tracking functionality to the HMD (e.g., for pilot health monitoring purposes) without otherwise interfering with the HMD optics or with the pilot's field of vision or adding excess weight to the HMD. Such a modular eye tracking system may be attached or detached to the HMD as needed, and compatible with on-helmet HMD electronics.

Figure 1:
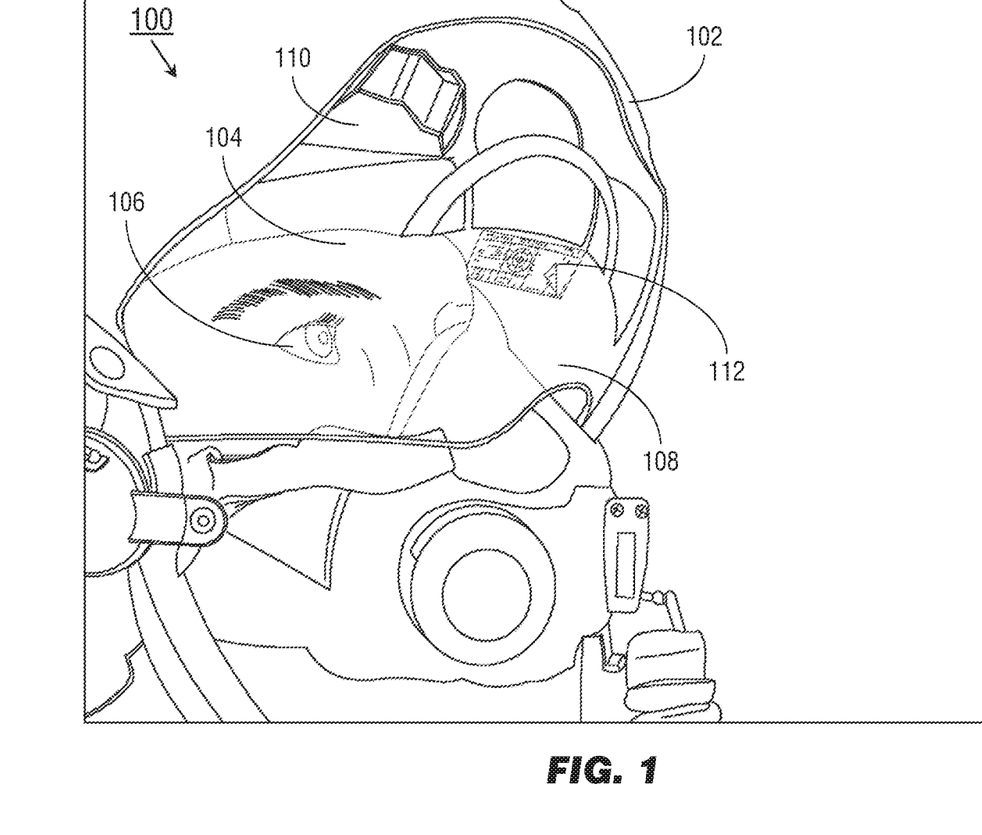
FIG. 1 illustrates an exemplary embodiment of an eye tracking system for a helmet-mounted display (HMD) according to the inventive concepts disclosed herein.

Referring to FIG. 1, an exemplary embodiment of a low-profile eye-tracking system 100 for an off-visor HMD 102 worn by a pilot 104 may track movement of the pilot's eyes (106) relative to the HMD 102. The HMD 102 may be described as off-visor in that the HMD may include a visor 108 which, while substantially transparent with respect to visible light, may have a coated interior surface that reflects selected wavelengths (e.g., visible or infrared (IR) light (including near-IR (NIR) and short-wave IR (SWIR) light)). The HMD 102 may include an optical chain physically coupled to onboard HMD electronics (e.g., a helmet tracker or onboard processor), and thereby to onboard systems of the piloted aircraft (e.g., graphics generators and onboard sensors). The optical chain of the HMD may terminate in a display projector assembly 110 (DPA) or like terminal component which projects synthetic vision system (SVS) symbology or other visual enhancements (112) directly onto the interior surface of the HMD visor 108 within the field of view of the pilot's eye 106. The positioning of the projected visual enhancements 112 on the interior surface of the HMD visor 108 may be, e.g., targeted to either the left or the right eye (106); based on measurements of the pupillary distance of the pilot 104; and based on pose data of the pilot's head, e.g., the position and orientation of the head/helmet relative to the aircraft as determined by a head-tracking system of the HMD 102. In this way, the head-tracking system of the HMD 102 may determine what the pilot 104 is viewing through the visor 108 (e.g., within a system field of view (FOV) of approximately 40 degrees by 30 degrees) and the HMD may superimpose additional detail with respect to objects within the current FOV (e.g., the distance, bearing, and velocity of identified objects), adjusting the displayed symbology accordingly as the pilot 104 moves his/her head relative to the aircraft.

Figure 2:
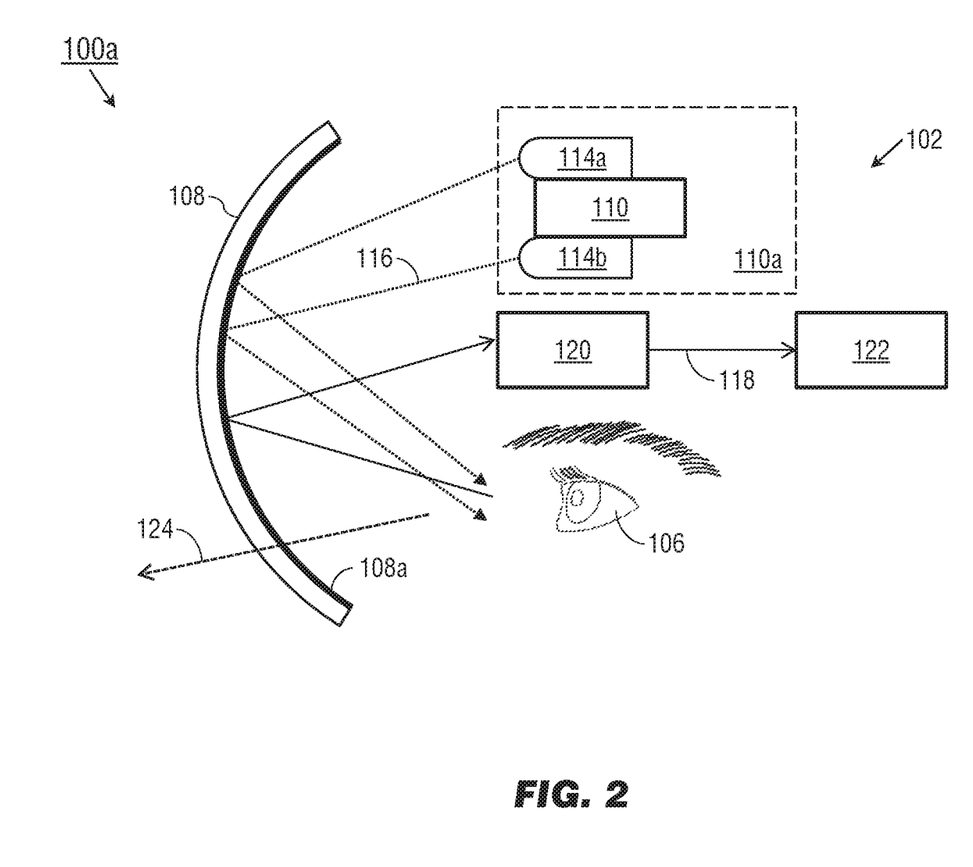
FIG. 2 is a diagrammatic illustration of the eye tracking system of FIG. 1.

Referring to FIG. 2, the eye tracking system 100a may be implemented and may function similarly to the eye tracking system 100 of FIG. 1, except that the eye tracking system 100a may track movement of an eye (106) of the pilot (104, FIG. 1) relative to the head (or to the HMD 102). The eye tracking system 100a may include one or more light emitting diodes 114a-b (LED) or appropriate similar light sources attached to, and substantially aligned with, the display projector assembly 110 or terminal component. The LEDs 114a-b illuminate the eye (106) via emitted light (116) reflected off the HMD visor 108 and into the eye. For example, the LEDs 114a-b may be visible light sources or infrared (IR) sources, e.g., near-infrared (NIR) LEDs emitting at a wavelength substantially between 750 and 1400 nm, or short-wave IR (SWIR) LEDs emitting at a wavelength substantially between 1400 nm and 3000 nm (3 mm). The interior surface of the HMD visor 108 may be coated (108a) to increase the reflectance of the HMD visor 108 without otherwise interfering with the operation of other components of the HMD 102, e.g., night vision (NV) cameras or image sensors, night vision goggles (NVG), or any other IR-based optical trackers or equipment.

The illuminated eye 106 may be captured as an image stream (118) reflected in the HMD visor 108 by a camera 120 or like image sensor mounted within the HMD 102. For example, the camera 120 may be configured to capture visible light or infrared wavelengths (e.g., IR, NIR, SWIR) depending on the configuration of the LEDs 114a-b. The camera 120 may send the captured image stream (118) to HMD electronics (122) onboard the helmet for processing to determine, e.g., the azimuth and elevation (124) of the eye 106 (e.g., relative to the centerline of the HMD optics (110a) based on analysis of each captured image. The HMD electronics 122 may be preprogrammed to correct the captured image stream 118 for video distortion correction, and auto-gain based on the interior curvature of the HMD visor 108 and brightness of the image stream (118).

Figure 3:
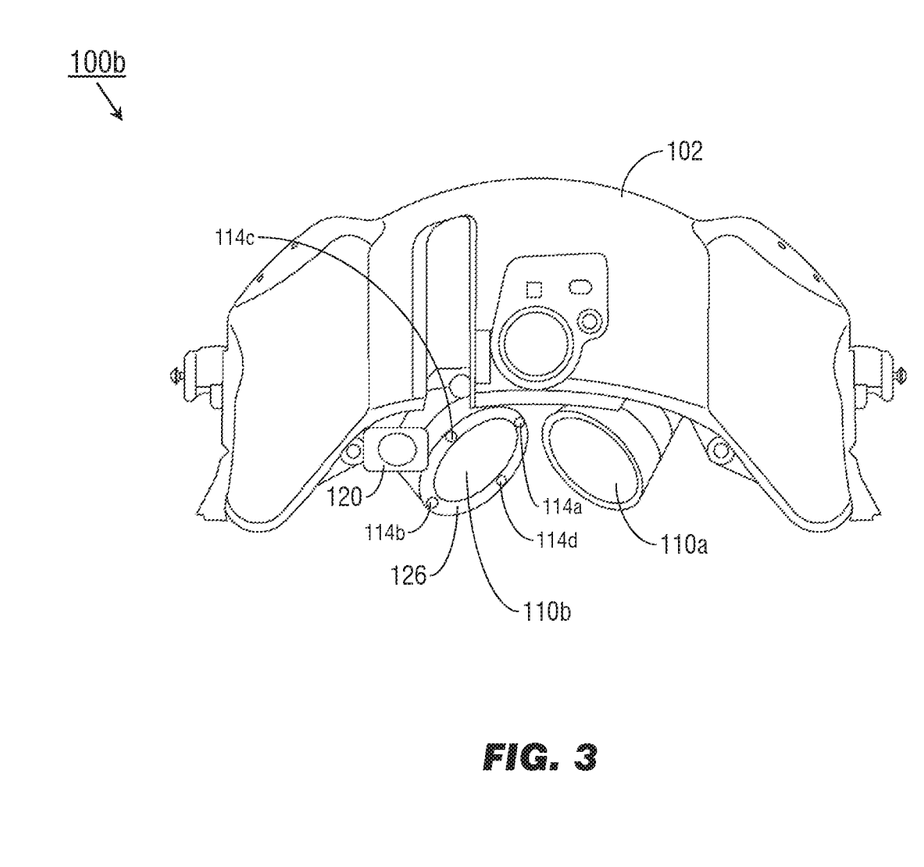
FIG. 3 illustrates components of the eye tracking system of FIG. 1.

Referring to FIG. 3, the eye tracking system 100b may be implemented and may function similarly to the eye tracking system 100a of FIG. 2, except that the eye tracking system 100b may include modular components attached to the interior of the HMD 102. For example, FIG. 3 shows a forward view of the HMD 102 facing the interior surface of the HMD visor (108, FIG. 2). Left-side and right-side DPAs 110a-b (e.g., the terminal components of the HMD optical chain) may be oriented toward the HMD visor 108, aligned substantially forward-facing with respect to the pilot (104, FIG. 1) such that SVS symbology/visual enhancements (112, FIG. 1) projected by the DPAs 110a-b are reflected by the HMD visor 108 as shown by FIGS. 1 and 2. The HMD eye tracking system 100b may include an illuminator (126) removably attached (e.g., clipped on) to a DPA 110a and the camera 120. The illuminator 126 may be substantially annular in shape so as to fit around the right-side DPA 110b and may include LEDs 114a-d disposed around the circumference of the illuminator (e.g., two or more LEDs, or any number necessary to sufficiently illuminate the eye (106, FIG. 2)). The eye tracking system 100b may be a single-eye system, wherein the LEDs 114a-d of the illuminator 114 illuminate the pilot's right eye 106 (and the corresponding image stream of the illuminated eye is captured by the camera 120), or a dual-eye system wherein a counterpart illuminator (not shown) is attached to the left-side DPA 110a for illuminating the left eye, and a counterpart camera (not shown) captures the corresponding image stream for processing and determination of the azimuth/elevation (124, FIG. 2) of the left eye. It is contemplated that the illuminator 126 and camera 120 may be added to the HMD 102 with minimal to no optical interference and a total component weight of 25 grams.

Figure 4:
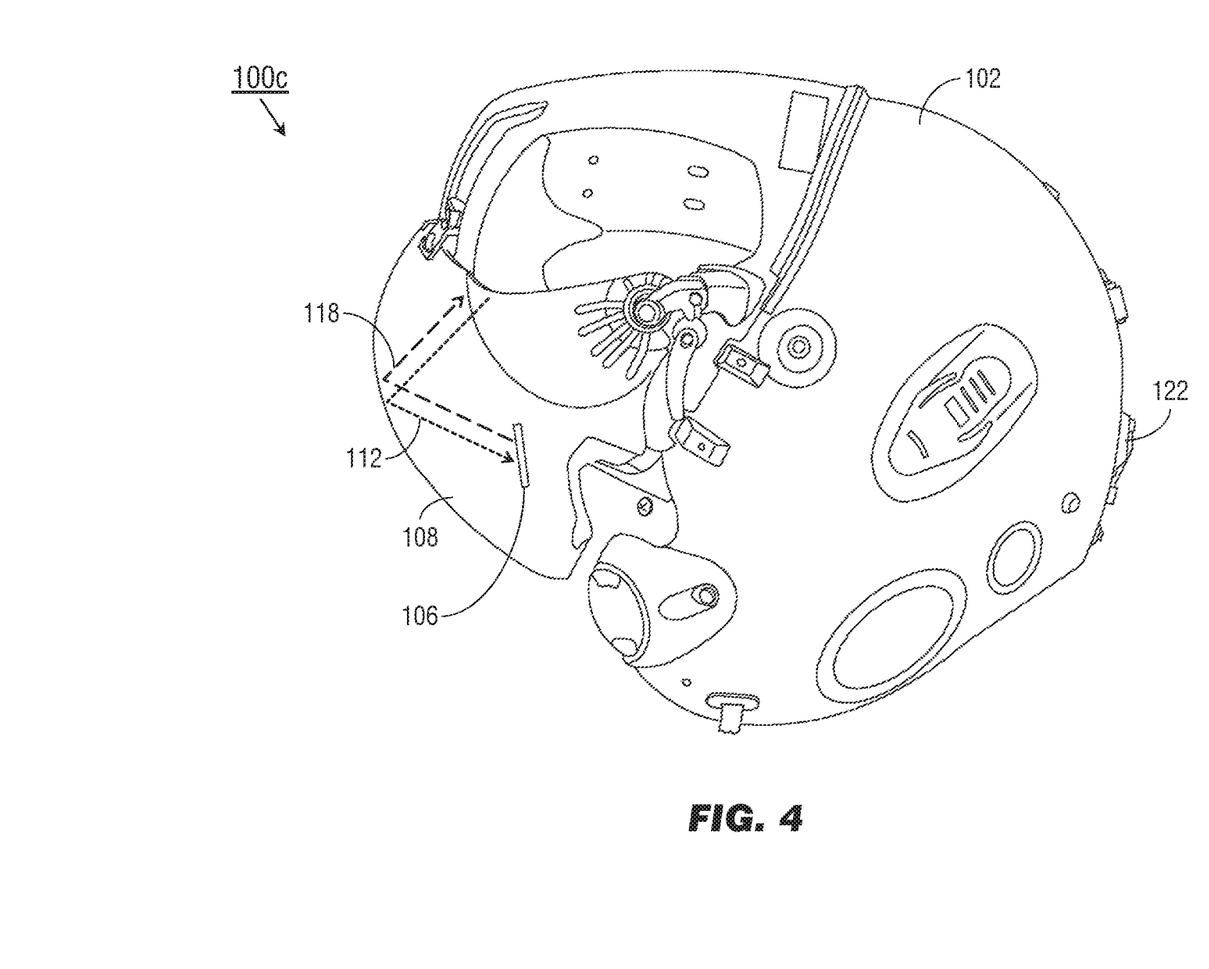
FIGS. 4 and 5 illustrate operations of the eye tracking system of FIG. 1.

Referring now to FIG. 4, the eye tracking system 100c may be implemented and may function similarly to the eye tracking system 100b of FIG. 3, except that the eye tracking system 100c of the HMD 102 may reflect emitted light (116) emitted by the illuminators (114, FIG. 3) via the reflective interior surface (108a, FIG. 2) of the HMD visor 108 to the location of the pilot's eye (106). An image stream (118) of the illuminated eye 106 may similarly be reflected by the HMD visor 108 to the camera (120, FIG. 3) proximate to the illuminators 114. The HMD electronics (122) onboard the helmet may receive and process the image stream 118 to determine the azimuth and elevation (124, FIG. 2) of the eye 106. For example, the image stream 118 may be processed as a 60 Hz stream or driven to 120 Hz or higher if desired.

Figure 5:
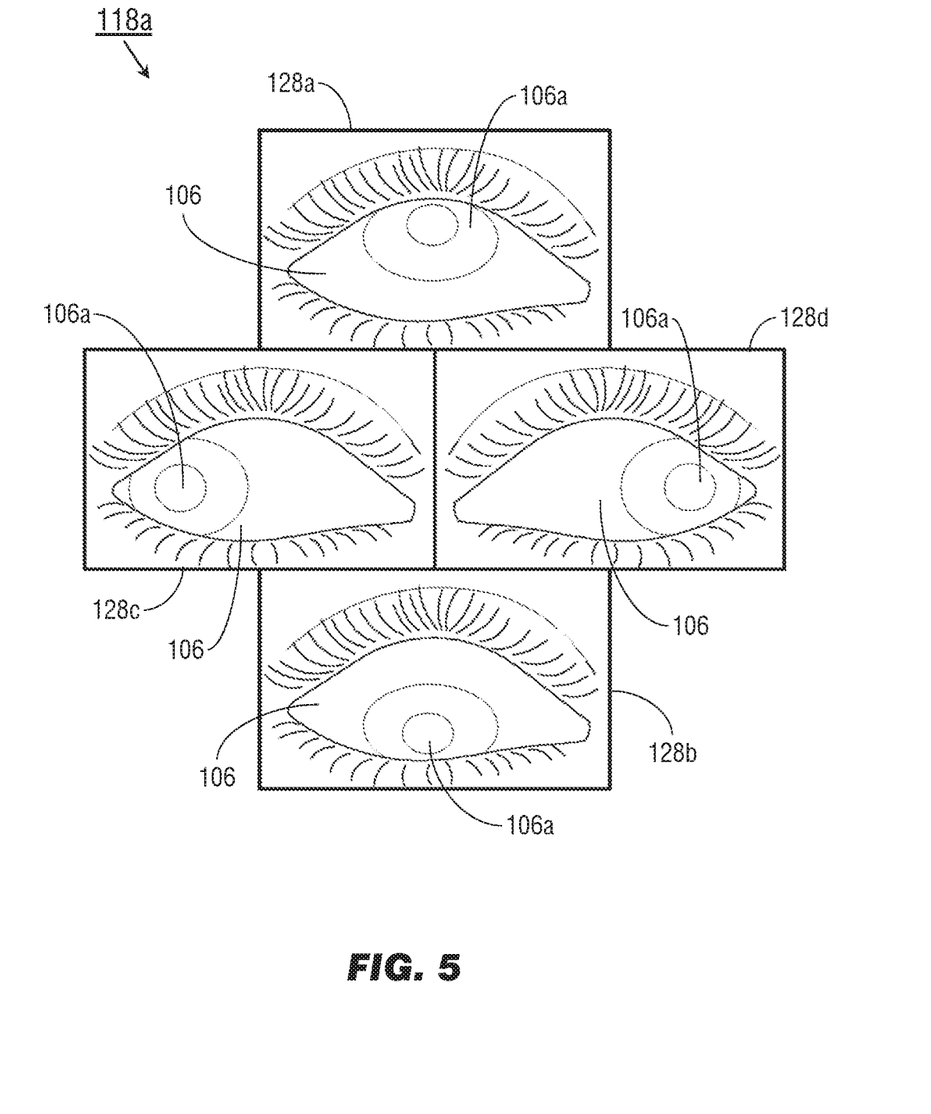

Referring to FIG. 5, the image stream 118a may be implemented and may function similarly to the image stream 118 of FIG. 4, except that the image stream 188a may capture a full 360-degree rotation of the eye 106 as shown by the position of the pupil (106a). For example, the images 128a-b may capture the pupil 106a rotated "up" and "down" (e.g., relative to the elevational axis) while the images 128c-d may capture the pupil 106a rotated "left" and "right" (e.g., relative to the azimuthal axis). The precise azimuth and elevation (124, FIG. 2) of the eye 106 may be determined by analysis of each individual image 128a-d by the HMD electronics (122, FIG. 4), e.g., relative to the centerline of the HMD optics (110a, FIG. 2).

Figure 6A:
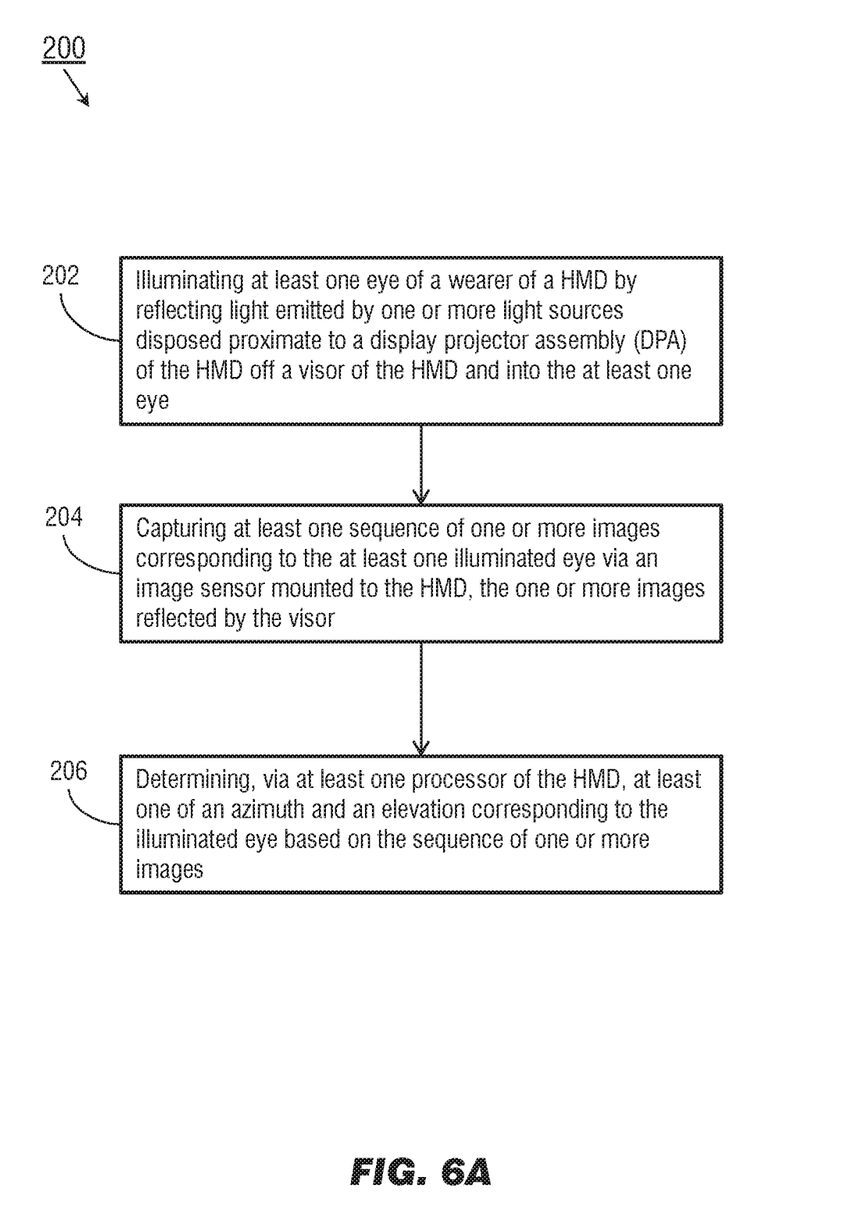
FIGS. 6A through 6C are process flow diagrams illustrating an exemplary embodiment of a method for eye tracking of an HMD according to the inventive concepts disclosed herein.

Referring to FIG. 6A, an exemplary embodiment of a method 200 for eye tracking of a HMD according to the inventive concepts disclosed herein may be implemented by the eye tracking systems 100, 100a-c in some embodiments, and may include one or more of the following steps.

At a step 202 the illuminators illuminate an eye of a pilot wearing the HMD by reflecting light emitted by the light sources of the illuminators off the visor of the HMD and into the eye. For example, left-side and right-side illuminators may independently illuminate the left and right eyes. The light sources may include visible-light sources, infrared (IR) illuminators (including near-IR or short-wave IR sources), or light-emitting diodes (LED).

At a step 204, the camera mounted to the HMD captures a sequence of images of the illuminated eye, the images reflected by the HMD visor. For example, left-side and right-side cameras may focus on, and capture images of, the illuminated left and right eyes respectively. The cameras or image sensors may include visible-light or IR (NIR, SWIR) image sensors.

At a step 206, onboard processors of the HMD receive the captured images and determine an azimuth and an elevation of the illuminated eye by analyzing the received images.

Figure 6B:
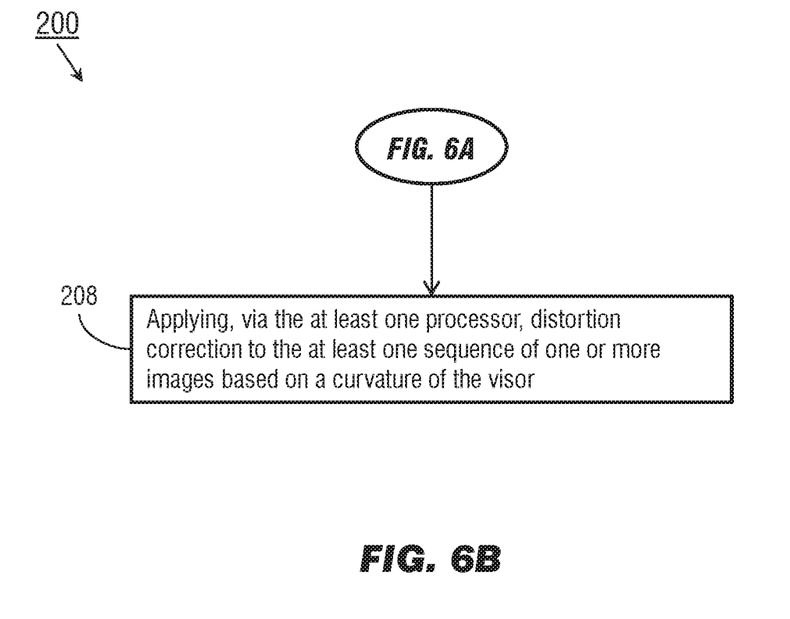

Referring now to FIG. 6B, the method 200 may include an additional step 208. At the step 208, the onboard processors apply distortion correction to the captured images to compensate for the curvature of the inner surface of the HMD visor in which the images of the illuminated eye are reflected.

Figure 6C:
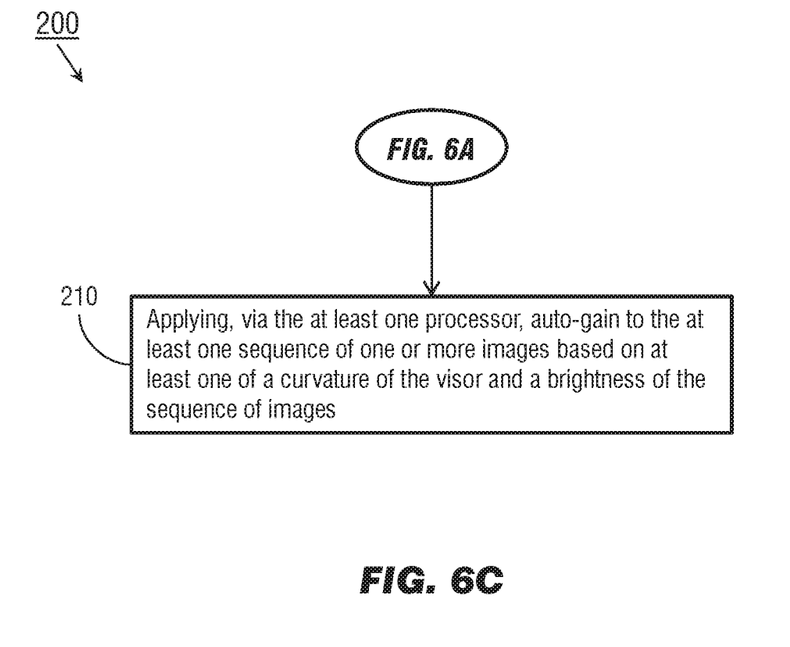

Referring to FIG. 6C, the method 200 may include an additional step 210. At the step 210, the onboard processors apply auto-gain to the captured images based on the curvature of the inner surface and/or the brightness of the captured image stream.

As will be appreciated from the above, an eye tracking system according to embodiments of the inventive concepts disclosed herein may provide eye tracking functionality to the HMD, providing additional health monitoring metrics and tracking outside the HMD field of view (HMD) without otherwise interfering with the HMD optics or with the pilot's FOV. Furthermore, the use of modular components allows implementation of the eye tracking system without adding significant weight.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A low profile eye tracking system for a helmet mounted display (HMD), comprising:
   at least one illuminator having an annular shape and removably attachable around a terminal display projector assembly of the HMD, the illuminator comprising a plurality of light sources in a circumferentially spaced apart relationship, the plurality of light sources configured to illuminate an eye of a wearer of the HMD by emitting light to be reflected by a visor of the HMD into the eye;
   at least one camera removably attached to the HMD proximate to the illuminator, the at least one camera configured to capture a sequence of images corresponding to the illuminated eye, the sequence of images reflected by the visor into the camera, the illuminator and the camera having a combined weight of not more than 25 grams;
   and
   one or more processors coupled to the HMD and communicatively coupled to the camera, the processors configured to:
     receive the sequence of images from the camera;
     apply distortion correction to the received sequence of images based on a curvature of the visor;
     and
     determine, based on the at least one corrected sequence of images, one or more of an azimuth and an elevation, the azimuth and the elevation corresponding to the illuminated eye.

2. The low-profile eye tracking system of claim 1, wherein:
   the at least one illuminator includes a left-side illuminator configured to illuminate a left eye of the wearer and a right-side illuminator configured to illuminate a right eye of the wearer;
   and the at least one camera includes a left-side camera configured to capture a first sequence of images corresponding to the left eye and a right-side camera configured to capture a second sequence of images corresponding to the right eye.

3. The low-profile eye tracking system of claim 1, wherein the system has a refresh rate of at least 60 Hz.

4. The low profile eye tracking system of claim 1, wherein:
the plurality of light sources includes a plurality of infrared light sources configured to emit infrared light; and
the camera includes at least one IR camera.

5. The low-profile eye tracking system of claim 4, wherein the plurality of infrared light sources includes at least one of a near-infrared (NIR) light source and a shortwave (SWIR) light source.

6. The low profile eye tracking system of claim 1, wherein:
the plurality of light sources includes a plurality of visible light sources configured to emit visible light; and
the camera includes at least one visible-light camera.

7. The low-profile eye tracking system of claim 1, wherein the plurality of light sources includes at least one light-emitting diode (LED).

8. The low-profile eye tracking system of claim 1, wherein the one or more processors are configured to apply auto-gain to the received sequence of images based on at least one of a curvature of the visor and a brightness of the received sequence of images.

9. The low-profile eye tracking system of claim 1, wherein the visor includes an interior surface having at least one reflective coating capable of increasing the reflectance of the interior surface.

10. A method for eye tracking for a helmet mounted display (HMD), comprising:
illuminating at least one eye of a wearer of a HMD by reflecting light emitted by one or more light sources disposed proximate to a display projector assembly (DPA) of the HMD off a visor of the HMD and into the at least one eye;
capturing at least one sequence of one or more images corresponding to the at least one illuminated eye via a camera mounted to the HMD, the one or more images reflected by the visor, the one or more light sources and the camera having a combined weight of not more than 25 grams;
applying, via the at least one processor, distortion correction to the at least one sequence of one or more images based on a curvature of the visor; and
determining, via at least one processor of the HMD, at least one of an azimuth and an elevation corresponding to the illuminated eye based on the sequence of one or more images.

11. The method of claim 10, wherein illuminating at least one eye of a wearer of a HMD by reflecting light emitted by one or more light sources disposed proximate to a display projector assembly (DPA) of the HMD off a visor of the HMD and into the at least one eye includes:
illuminating a left eye of the wearer by reflecting light emitted by one or more left-side light sources disposed proximate to a left-side DPA of the HMD off a visor of the HMD and into the left eye; and
illuminating a right eye of the wearer by reflecting light emitted by one or more right-side light sources disposed proximate to a right-side DPA of the HMD off a visor of the HMD and into the right eye.

12. The method of claim 11, wherein capturing at least one sequence of one or more images corresponding to the at least one illuminated eye via a camera mounted to the HMD, the one or more images reflected by the visor includes:
capturing at least one first sequence of one or more first images corresponding to the left eye via a left-side camera proximate to the left-side DPA; and
capturing at least one second sequence of one or more second images corresponding to the right eye via a right-side camera proximate to the right-side DPA.

13. The method of claim 10, wherein illuminating at least one eye of a wearer of a HMD by reflecting light emitted by one or more light sources disposed proximate to a display projector assembly (DPA) of the HMD off a visor of the HMD and into the at least one eye includes:
illuminating at least one eye of a wearer of a HMD by reflecting visible light emitted by one or more visible-light sources disposed proximate to a DPA of the HMD off a visor of the HMD and into the at least one eye.

14. The method of claim 10, wherein illuminating at least one eye of a wearer of a HMD by reflecting light emitted by one or more light sources disposed proximate to a display projector assembly (DPA) of the HMD off a visor of the HMD and into the at least one eye includes:
illuminating at least one eye of a wearer of a HMD by reflecting infrared (IR) light emitted by one or more of an IR light source, a near-IR (NIR) light source, and a short-wave IR (SWIR) light source disposed proximate to a DPA of the HMD off a visor of the HMD and into the at least one eye.

15. The method of claim 10, wherein illuminating at least one eye of a wearer of a HMD by reflecting light emitted by one or more light sources disposed proximate to a display projector assembly (DPA) of the HMD off a visor of the HMD and into the at least one eye includes:
illuminating the at least one eye by reflecting light emitted by one or more light emitting diodes (LED) disposed proximate to the DPA off the visor and into the at least one eye.

16. The method of claim 10, further comprising:
applying, via the at least one processor, auto-gain to the at least one sequence of one or more images based on at least one of a curvature of the visor and a brightness of the sequence of images.

* * * * *